US009879750B2

United States Patent
Husband et al.

(10) Patent No.: US 9,879,750 B2
(45) Date of Patent: Jan. 30, 2018

(54) SYSTEMS AND METHODS FOR OIL DAMPING WITH TEXTURED DAMPER SURFACES

(71) Applicant: United Technologies Corporation, Hartford, CT (US)

(72) Inventors: Jason Husband, South Glastonbury, CT (US); John Zhiqiang Wang, South Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 58 days.

(21) Appl. No.: 15/053,803

(22) Filed: Feb. 25, 2016

(65) Prior Publication Data

US 2017/0248191 A1    Aug. 31, 2017

(51) Int. Cl.
| | | |
|---|---|---|
| F16C 23/00 | (2006.01) | |
| F16F 15/023 | (2006.01) | |
| F16F 9/10 | (2006.01) | |
| F16C 19/52 | (2006.01) | |
| F01D 25/16 | (2006.01) | |
| F16C 27/04 | (2006.01) | |
| F16C 19/06 | (2006.01) | |

(52) U.S. Cl.
CPC .......... *F16F 15/023* (2013.01); *F01D 25/164* (2013.01); *F16C 19/527* (2013.01); *F16C 27/045* (2013.01); *F16F 9/10* (2013.01); *F16F 15/0237* (2013.01); *F05D 2220/32* (2013.01); *F05D 2230/30* (2013.01); *F05D 2240/54* (2013.01); *F16C 19/06* (2013.01); *F16C 2220/00* (2013.01); *F16C 2360/23* (2013.01)

(58) Field of Classification Search
CPC ..................................................... F16C 27/045
See application file for complete search history.

(56) References Cited

U.S. PATENT DOCUMENTS

| | | | |
|---|---|---|---|
| 3,364,771 A | 1/1968 | Takashi Takahashi | |
| 4,527,912 A | 7/1985 | Klusman | |
| 4,545,586 A * | 10/1985 | von Pragenau | F16J 15/444 277/414 |
| 5,110,257 A * | 5/1992 | Hibner | F01D 25/164 415/119 |
| 5,211,489 A | 5/1993 | Moore | |

(Continued)

FOREIGN PATENT DOCUMENTS

| | | |
|---|---|---|
| DE | 952756 | 11/1956 |
| GB | 1284602 | 8/1972 |

(Continued)

OTHER PUBLICATIONS

EP Search report dated Sep. 8, 2017 in EP Application No. 17157980.8.

*Primary Examiner* — Thomas R Hannon
(74) *Attorney, Agent, or Firm* — Snell & Wilmer, L.L.P.

(57) ABSTRACT

A damper system may include an inner damper having a first annular geometry and a textured surface. An outer damper may also have an annular geometry and be disposed about the inner damper. The outer damper may have a textured surface. The textured surfaces of the inner damper and outer damper may define a cavity that is configured to contain a viscous fluid.

20 Claims, 12 Drawing Sheets

(56) References Cited

U.S. PATENT DOCUMENTS

| | | | | | |
|---|---|---|---|---|---|
| 5,228,784 | A | * | 7/1993 | Bobo | F16C 27/045 |
| | | | | | 384/487 |
| 5,501,531 | A | * | 3/1996 | Hamaekers | B60K 17/24 |
| | | | | | 384/536 |
| 6,196,721 | B1 | | 3/2001 | Farkaly | |
| 9,470,263 | B2 | * | 10/2016 | Savela | F02C 7/06 |
| 2006/0204153 | A1 | | 9/2006 | Alam | |
| 2011/0064340 | A1 | * | 3/2011 | Duong | F16C 27/045 |
| | | | | | 384/99 |

FOREIGN PATENT DOCUMENTS

| | | | | |
|---|---|---|---|---|
| GB | 1284602 A | * | 8/1972 | F01D 25/164 |
| JP | H06109018 | | 4/1994 | |
| JP | 2000002257 | | 1/2000 | |
| WO | 2015088634 | | 6/2015 | |

\* cited by examiner

SYSTEMS AND METHODS FOR OIL DAMPING WITH TEXTURED DAMPER SURFACES

FIELD

The disclosure relates generally to gas turbine engines, and more particularly to damping devices within gas turbine engine bearing compartments.

BACKGROUND

Gas turbine engines typically comprise bearings which support rotating shafts. The bearings may comprise an inner race which rotates with the shaft, and a plurality of rollers between the inner race and an outer race which does not rotate. One or more seals may contain an annulus between the outer race and a housing. Oil may be fed into the annulus. The oil may form a squeeze film damper which damps whirling of the shaft, in which the shaft deflects away from an engine centerline and precesses about the engine centerline. However, under certain conditions, the squeeze film damper may degrade in its ability to damp rotor motion, an effect known as "oil inertia." In such conditions, prior methods have involved turning the supply of oil to the squeeze film damper off with an external valve, rendering the squeeze film damper ineffective.

SUMMARY

According to various embodiments, a fluid damping system is provided. The system may include an inner damper having a first annular geometry and a textured surface. An outer damper may also have an annular geometry and be disposed about the inner damper. The outer damper may also have a textured surface. The textured surfaces of the inner damper and outer damper may define a cavity that is configured to contain a viscous fluid.

In various embodiments, the inner damper and/or the outer damper may comprise steel. The damper system may also include a seal to retain the viscous fluid within the cavity. A cooling fin may be configured to cool the viscous fluid. The cooling fin and/or the textured surfaces may be made using additive manufacturing. The inner damper may be configured for mechanical coupling to a bearing, and the outer damper is configured for mechanical coupling to a housing. The inner damper and/or the outer damper may include oil passages or dimples. An intermediate damper may have an annular geometry and be disposed between the outer damper and the inner damper.

A bearing assembly may include a bearing having an annular geometry. The bearing may be configured to rotate about an axis. A first damper may be disposed about the bearing with the first damper comprising a textured surface. The textured surface may be configured to contact a viscous fluid. A housing may be disposed about the first damper. The first damper may also be configured to dampen a deflection of the bearing in response to rotation about the axis.

In various embodiments, a second damper disposed about the first damper. The first damper and the second damper may define a cavity. A third damper may have an annular geometry and be disposed between the first damper and the second damper. The textured surface of the first damper may include a plurality of oil passages and/or a plurality of dimples. The first damper may be made using additive manufacturing. The first damper may be configured to dampen a deflection of the bearing in response to a rotation about an axis of at least one of an inner race of the bearing or an outer race of the bearing.

A gas turbine engine may have an engine center line. A bearing may have an axis of rotation that is configured to deflect relative to the engine center line in response to a rotation of the bearing. A housing may be disposed about the bearing. A damper may also be disposed about the bearing, the damper at least partially defining a cavity.

In various embodiments, the damper may comprise a textured surface configured to dampen deflection. The damper may be made using additive manufacturing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein. "forward" refers to the direction associated with the nose (e.g., the front end) of an aircraft, or generally, to the direction of flight or motion.

Figure 1:
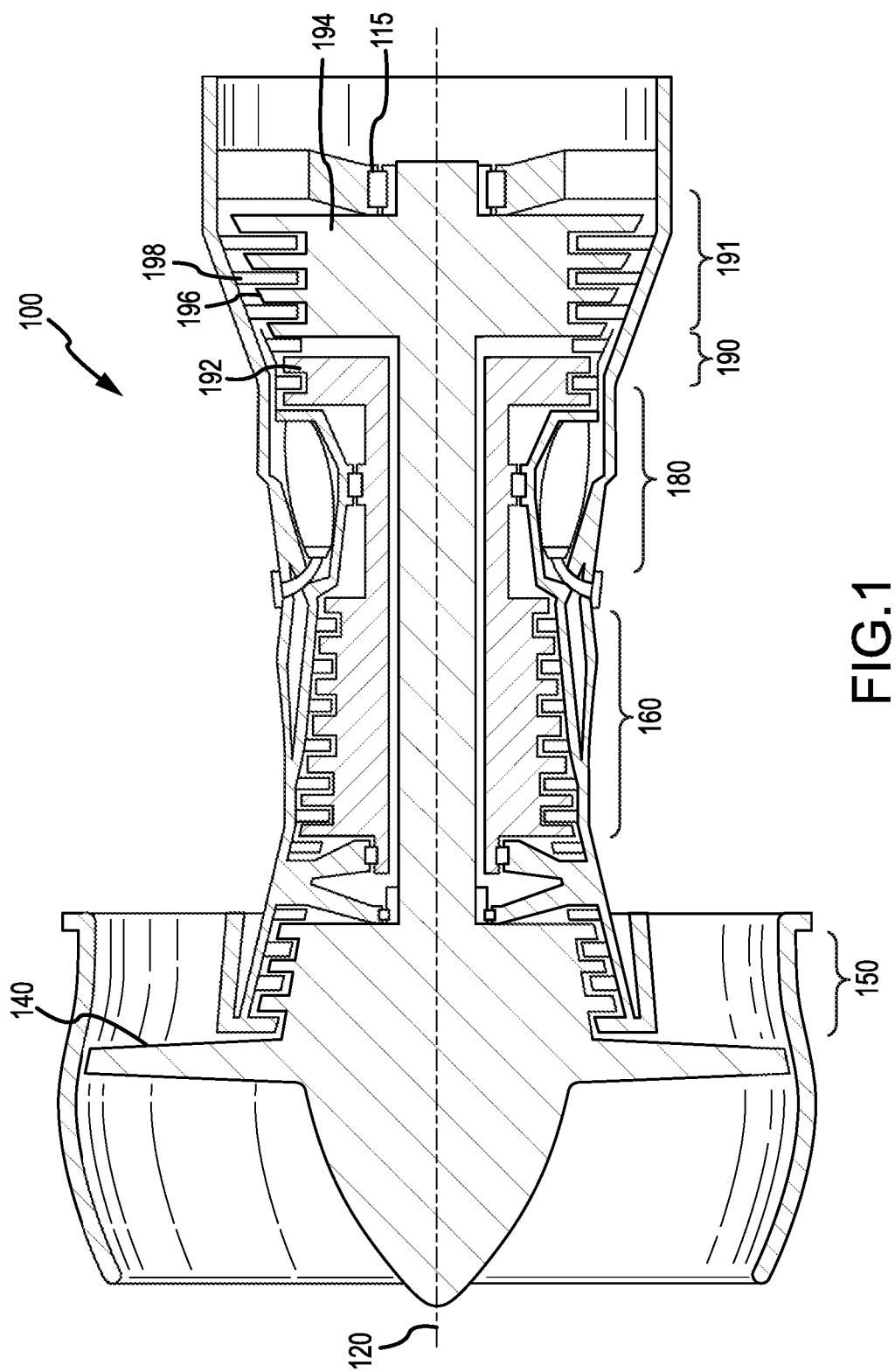
FIG. 1 illustrates a cross sectional view of an exemplary gas turbine engine, in accordance with various embodiments.

Referring to FIG. 1, a gas turbine engine 100 (such as a turbofan gas turbine engine) illustrated according to various embodiments. Gas turbine engine 100 is disposed about engine centerline 120, which may also be referred to as axis of rotation 120. Gas turbine engine 100 may comprise a fan 140, compressor sections 150 and 160, a combustion section 180 including a combustor, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the combustor and turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of rotating machinery, turbomachinery, and pumps, including turbofan gas turbine engines and turbojet engines, for all types of applications. This may also extend when used in combination with other bearing types in said applications including journal type bearings.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2A:
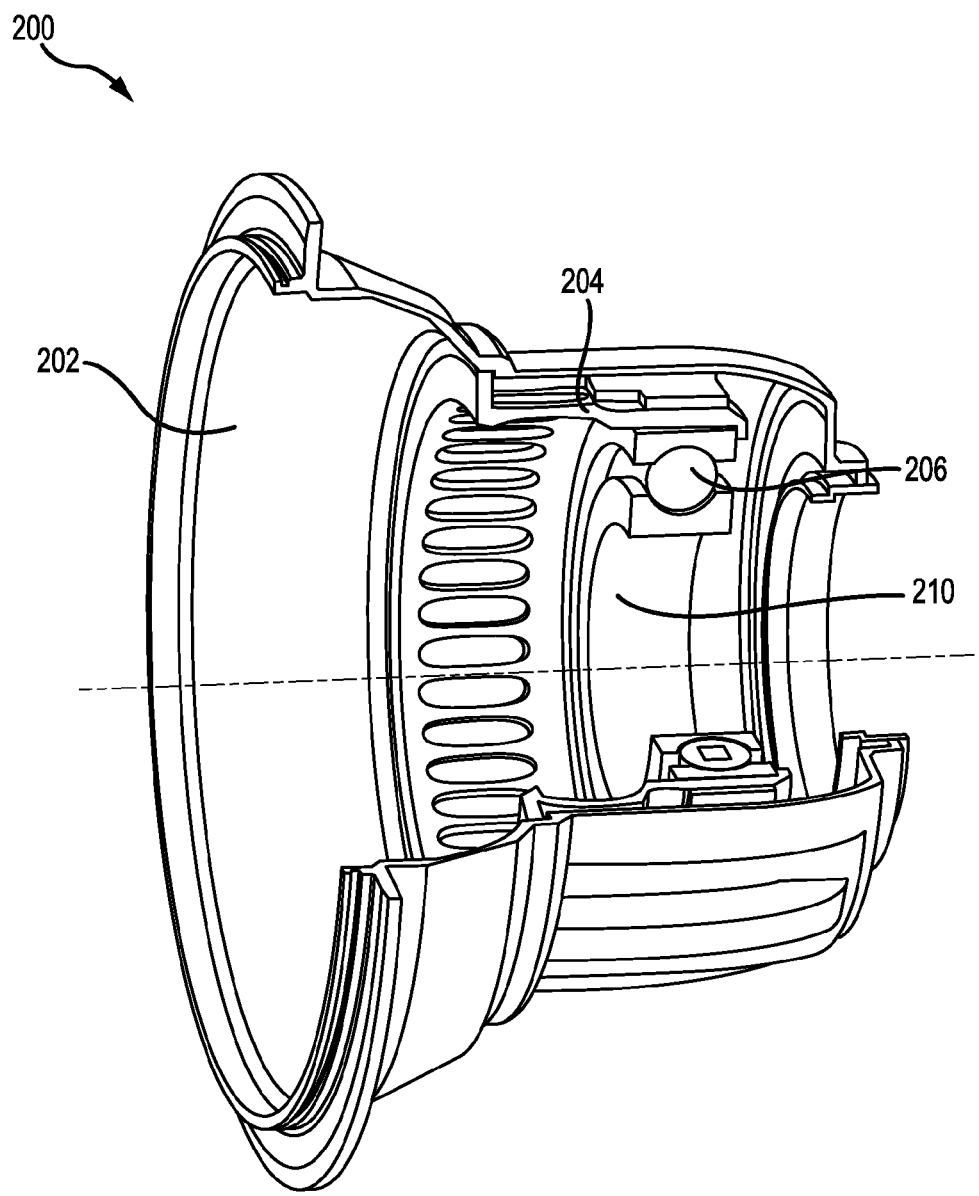
FIG. 2A illustrates a perspective view of a cutaway portion of an exemplary bearing housing, in accordance with various embodiments.
Figure 2B:
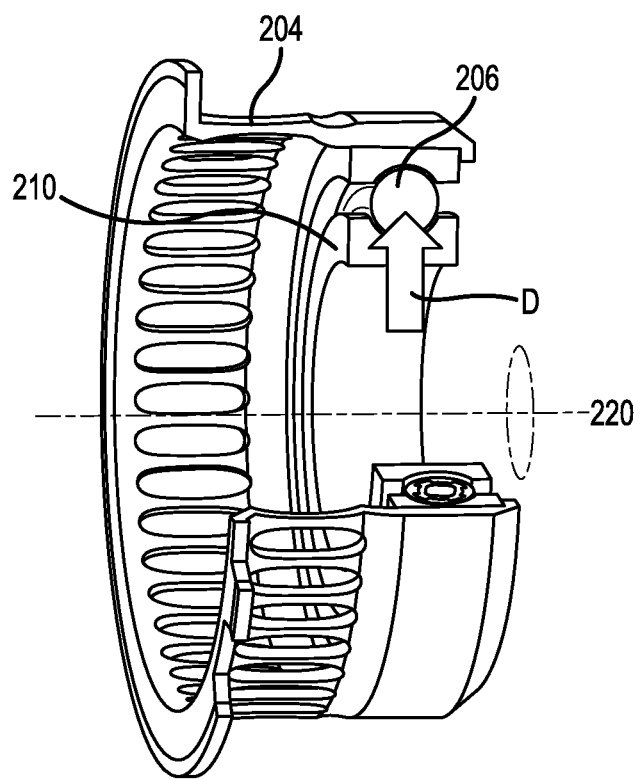
FIG. 2B illustrates a perspective view of a cutaway portion of a bearing and squirrel cage, in accordance with various embodiments.
Figure 2C:
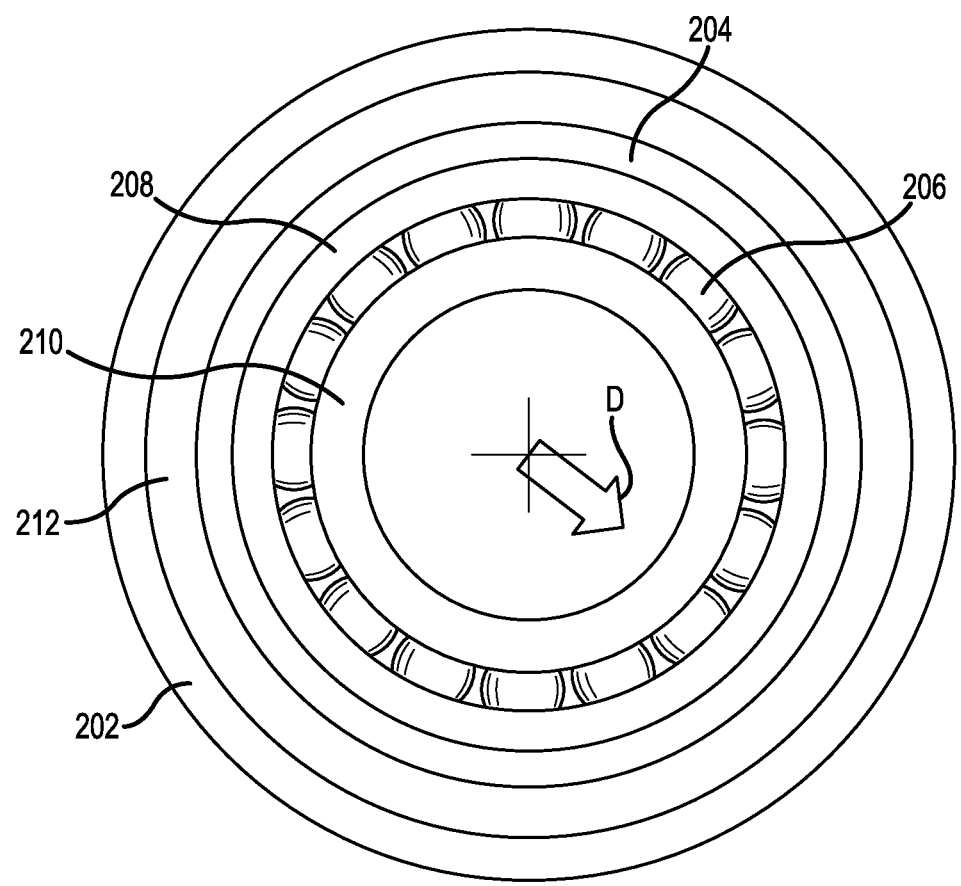
FIG. 2C illustrates a cross sectional view of an exemplary bearing housing, in accordance with various embodiments.
Figure 3A:
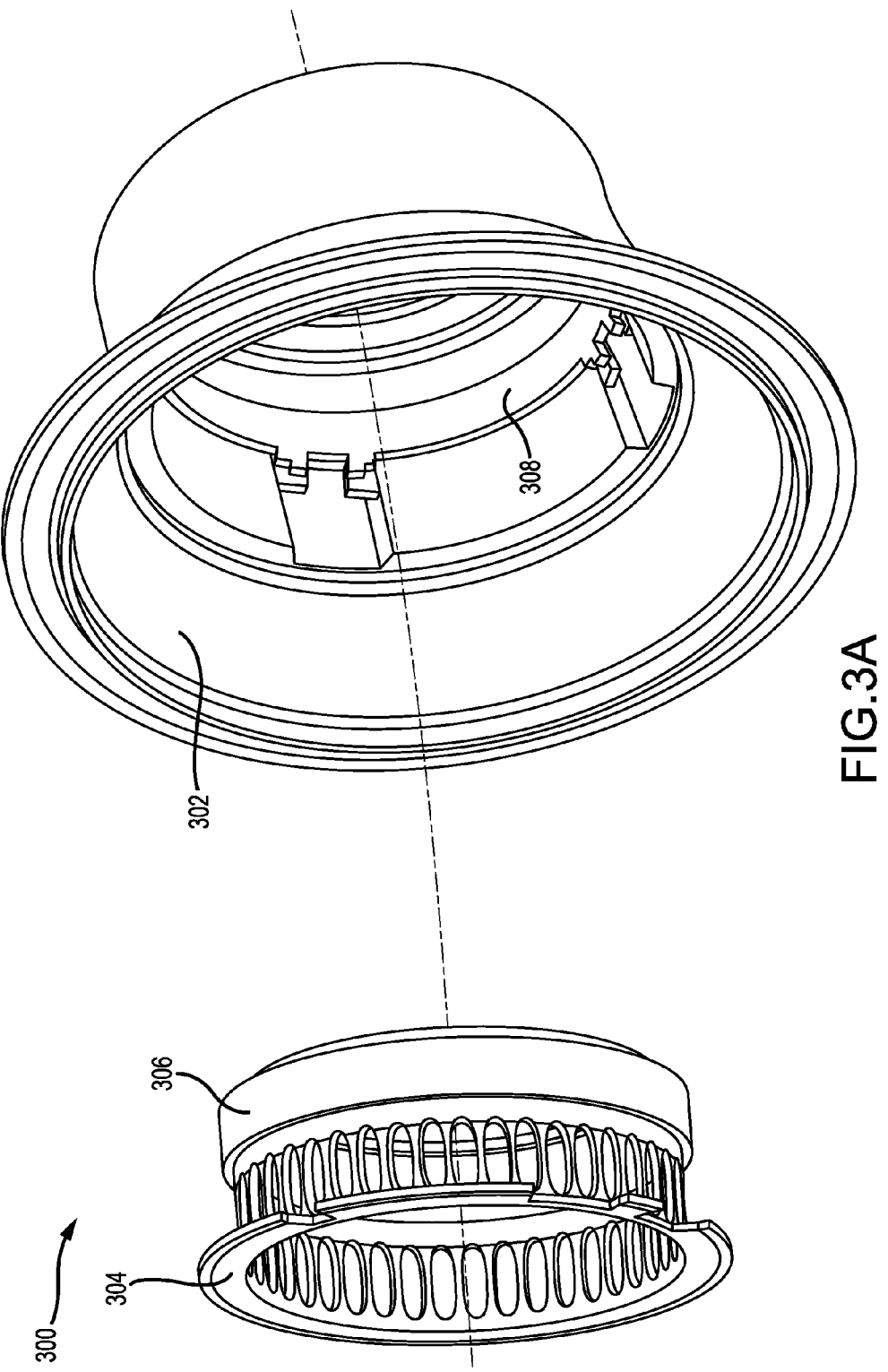
FIG. 3A illustrates a perspective view of a squirrel cage and housing having textured cartridges to form a damper, in accordance with various embodiments.
Figure 3B:
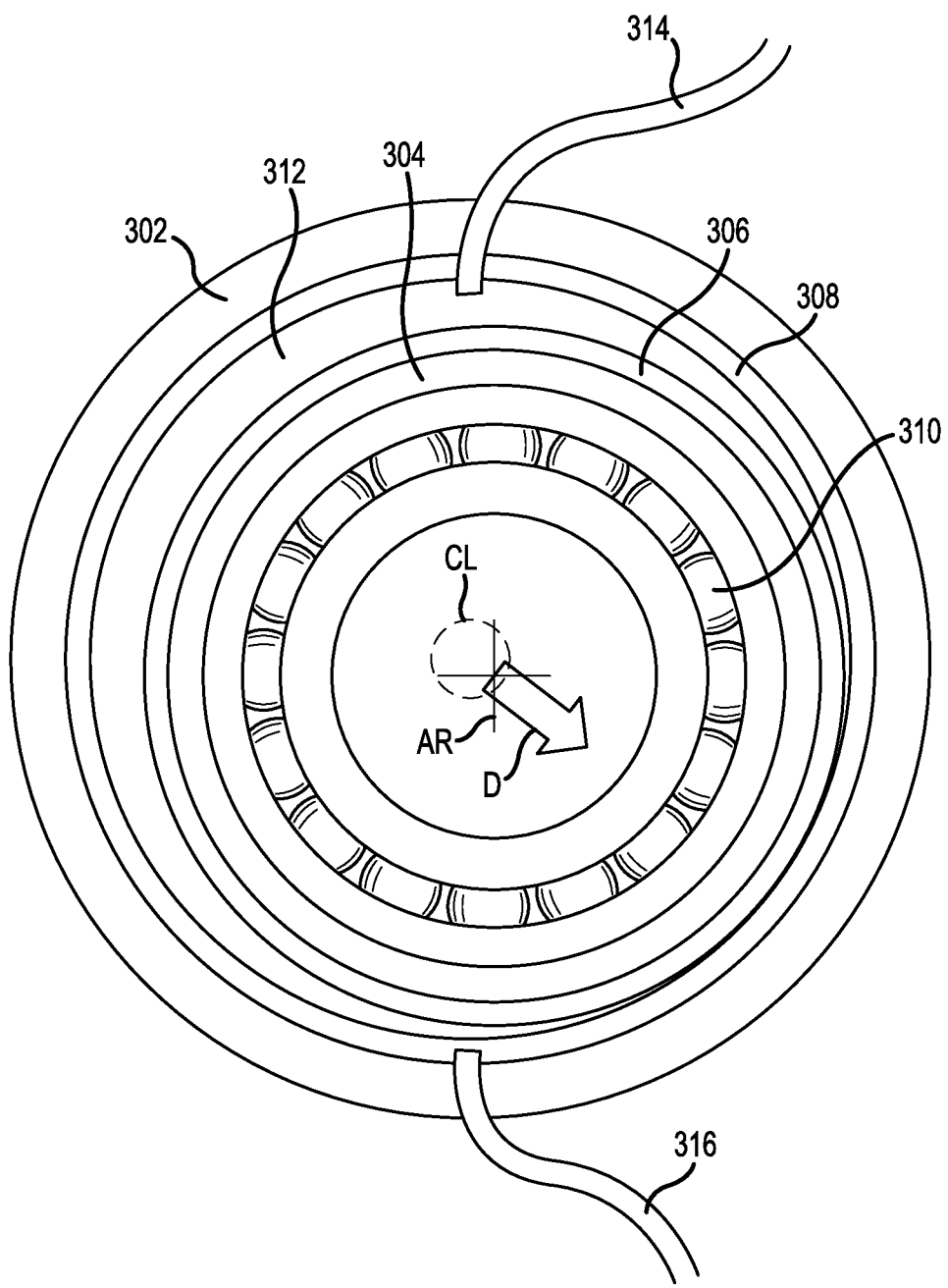
FIG. 3B illustrates a cross sectional view of a bearing housing looking forward to aft with the bearing housing having an inner damper and outer damper, in accordance with various embodiments.
Figure 3C:
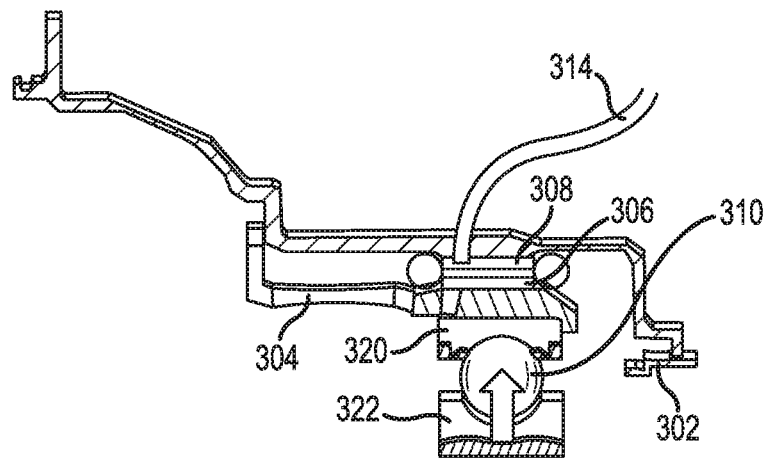
FIG. 3C illustrates a radial cross sectional view of a bearing housing, in accordance with various embodiments.
Figure 3D:
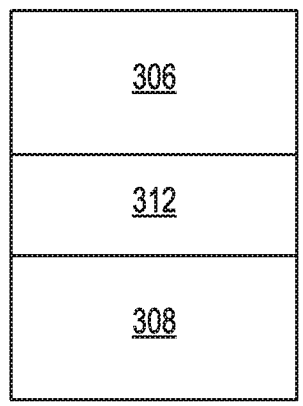
FIG. 3D illustrates an inner cartridge and an outer cartridge with a viscous oil layer between the cartridges, in accordance with various embodiments.

Referring to FIGS. 2A-2C, bearing assembly 200 is shown, in accordance with various embodiments. Bearing assembly 200 may include housing 202 having an annular or frustoconical geometry. Squirrel cage 204 may be disposed radially inward from housing 202. Squirrel cage 204 may retain bearing 206 with outer race 208 contacting squirrel cage 204. Inner race 210 may be configured to rotate relative to outer race 208. In that regard, inner race 210 may rotate about axis 220 with outer race 208 exhibiting little or no angular displacement. Squirrel cage 204 and/or outer race 208 may define an inner boundary of cavity 212. Housing 202 may define an outer boundary of cavity 212.

In various embodiments, squirrel cage 204 and/or bearing 206 may experience deflection D in response to rotation. Cavity 212 may contain viscous fluid such as oil to provide damping. The viscosity and fluid characteristics of the fluid retained in cavity 212 may affect damping performance. Damping may be improved by selectively creating laminar and/or turbulent flow of the viscous fluid in cavity 212.

With reference to FIGS. 3A to 3D, a bearing assembly 300 similar to bearing assembly 200 of FIG. 2 is shown, in accordance with various embodiments. Bearing assembly 300 may include an inner damper 306 mechanically coupled to squirrel cage 304. Inner damper 306 may be, for example, press fit or fastened to squirrel cage 304. Bearing assembly 300 may also include an outer damper 308 mechanically coupled to housing 302. Inner damper 306 and outer damper 308 may have annular geometries with inner damper 306 having a smaller diameter than outer damper 308. Outer damper 308 may thus be disposed radially outward from inner damper 306 to define cavity 312 between ouster damper 308 and inner damper 306.

In various embodiments, cavity 312 may contain viscous fluid such as oil to provide damping. The oil may be at least partially retained in cavity 312 by inner damper 306 and outer damper 308. Oil retained in cavity 312 may flow and interact with a textured surface of inner damper 306 and/or outer damper 308. The surfaces of inner damper 306 and outer damper 308 may thus impact oil flow and characteristics. The textured surfaces of inner damper 306 and outer damper 308 may include, for example, intermittent dimpling to disrupt harmonics, features to delay laminar-to-turbulent transitions, and/or features to inhibit oil film cavitation. The texture geometries of inner damper 306 and/or outer damper 308 may include, for example, dimples, shaped holes, random bumps, tubular dissipation passages, porosity, oil input passages, varying gap width, and/or other suitable configurations.

In various embodiments, oil input tube 314 may deliver oil into cavity 312. Oil may pass through one or more openings in outer damper 308 into cavity 312. Oil input tube 314 may be in fluid communication with a plurality of oil input passages at least partially defined by outer damper 308. Oil may also pass through one or more openings in outer damper 308 and through oil output tube 316. In that regard, oil may be added and/or removed to cavity 312 or otherwise circulated.

In various embodiments, engine centerline CL may be the centerline of a gas turbine engine. Axis of rotation AR may be the axis of rotation of bearing 310. The axis of rotation of bearing 310 may deflect relative the engine centerline CL in response to the rotation of at least one of inner race 322 or outer race 320 of bearing 310. The damper system including inner damper 306 and/or outer damper 308 may dampen the deflection in response to the rotation of bearing 310 at least partially by improving the fluid characteristics of a viscous fluid in cavity 312.

Inner damper 306 and/or outer damper 308 may be formed using additive manufacturing techniques. Additive manufacturing techniques may include direct metal laser sintering, selective laser sintering, selective laser melting, electron-beam melting, or electron-beam freeform fabrication. Additive manufacturing techniques may enable the formation of complex contours on inner damper 306 and outer damper 308.

Figure 4:
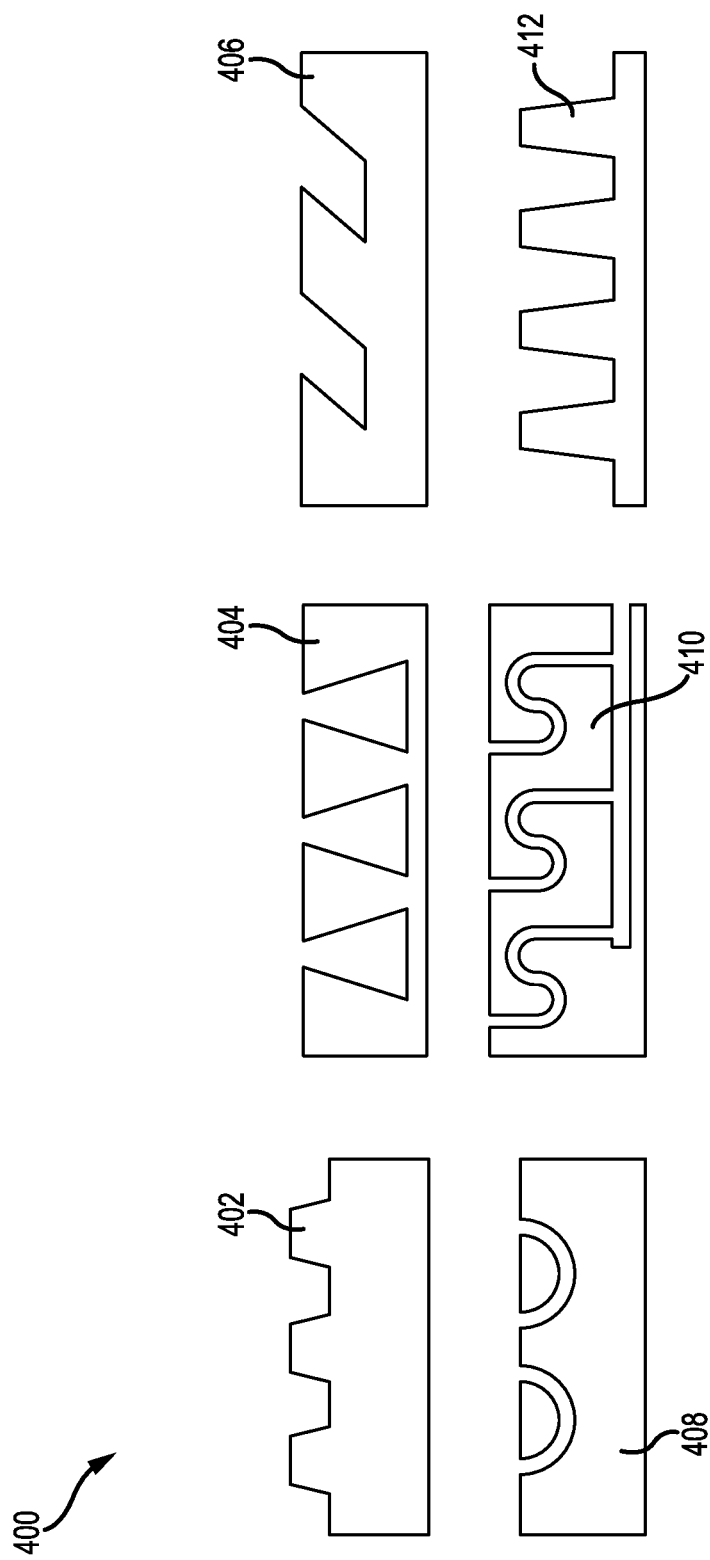
FIG. 4 illustrates exemplary surface configurations for dampers in a bearing housing, in accordance with various embodiments.

In various embodiments, and referring to FIG. 4, surface textures for inner damper 306 and/or outer damper 308 are shown, in accordance with various embodiments. The textured surface of inner damper 306 and/or outer damper 308 may be an irregularly textured surface 402 where the texture includes depressions and protrusions that vary in shape, depth, width, and/or spacing. The textured surface 404 of inner damper 306 and/or outer damper 308 may also include tapered triangular recesses having a narrow opening and broad base. Textured surface 404 may be formed as grooves, trenches, circular dimples, squared dimples, or other suitable shaped dimples.

In various embodiments, the textured surface 406 of inner damper 306 and/or outer damper 308 may include angled dimples that enter the surface of the dampers at an angle that is less than or more than 90 degrees. The angled dimples of textured surface 406 may be extended as grooves or trenches, or the angled dimples may be cylindrical or otherwise shaped. The textured surface 408 of inner damper 306 and/or outer damper 308 may also include oil passages. Oil passages may be configured to remove oil from cavity 312 of FIG. 3 and deliver oil back to cavity 312.

In various embodiments, the textured surface 410 of inner damper 306 and/or outer damper 308 may include oil passages comprising oil input passages and/or oil output passages to deliver oil to and/or extract oil from cavity 312. The textured surface 412 of inner damper 306 and/or outer damper 308 may also include dimples having regular shape and protruding from the damper. The geometries of FIG. 4 are provided as exemplary textured surfaces of inner damper 306 and/or outer damper 308, and other textured surfaces having varying geometries may also be suitable to limit vibration resulting from rotating machinery.

Figure 5A:
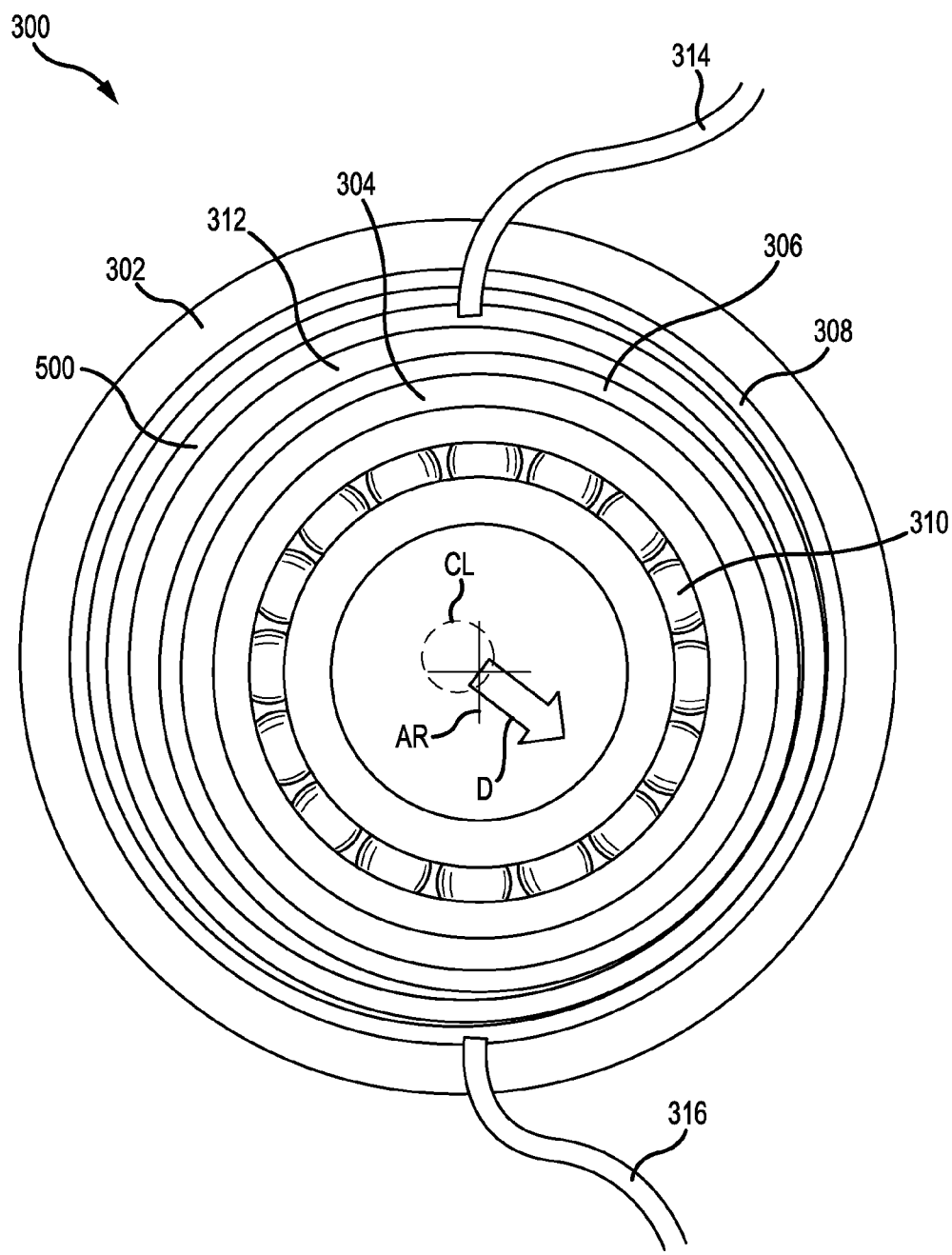
FIG. 5A illustrates a cross sectional view of a bearing housing looking forward to aft with the bearing housing having an inner damper, an outer damper, and an intermediate damper, in accordance with various embodiments.
Figure 5B:
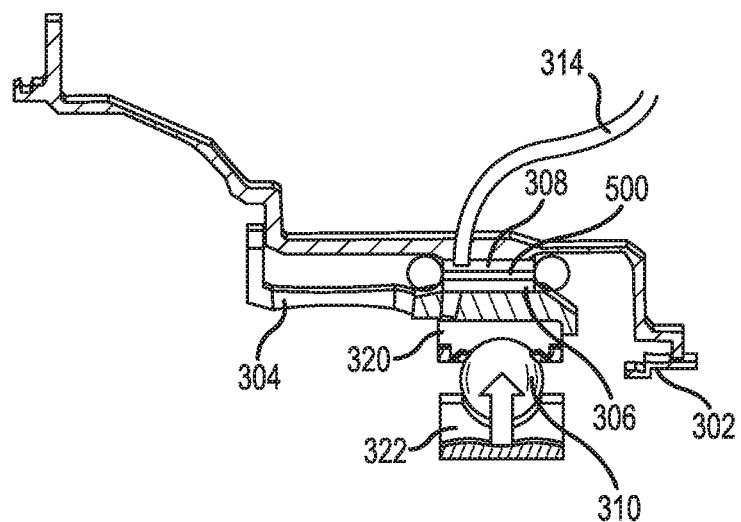
FIG. 5B illustrates a radial cross sectional view of a bearing housing having an inner damper, an outer damper, and an intermediate damper, in accordance with various embodiments.

With reference to FIGS. 5A to 5B, a bearing assembly 300 having an intermediate damper 500 is shown, in accordance with various embodiments. Intermediate damper 500 may have similar properties as inner damper 306 and/or outer damper 308. Intermediate damper may have an annular shape and be disposed between inner damper 306 and outer damper 308 in cavity 312. Intermediate damper may float freely within cavity 312 and have one or more textured surfaces to improve flow characteristics of viscous fluid and thereby improve damping. The deflection of bearing 310 and/or squirrel cage 304 may press inner damper 306 towards intermediate damper 500 in response to deflection D. The intermediate damper 500 may thus deflect in response to the rotation of bearing 310.

Figure 6A:
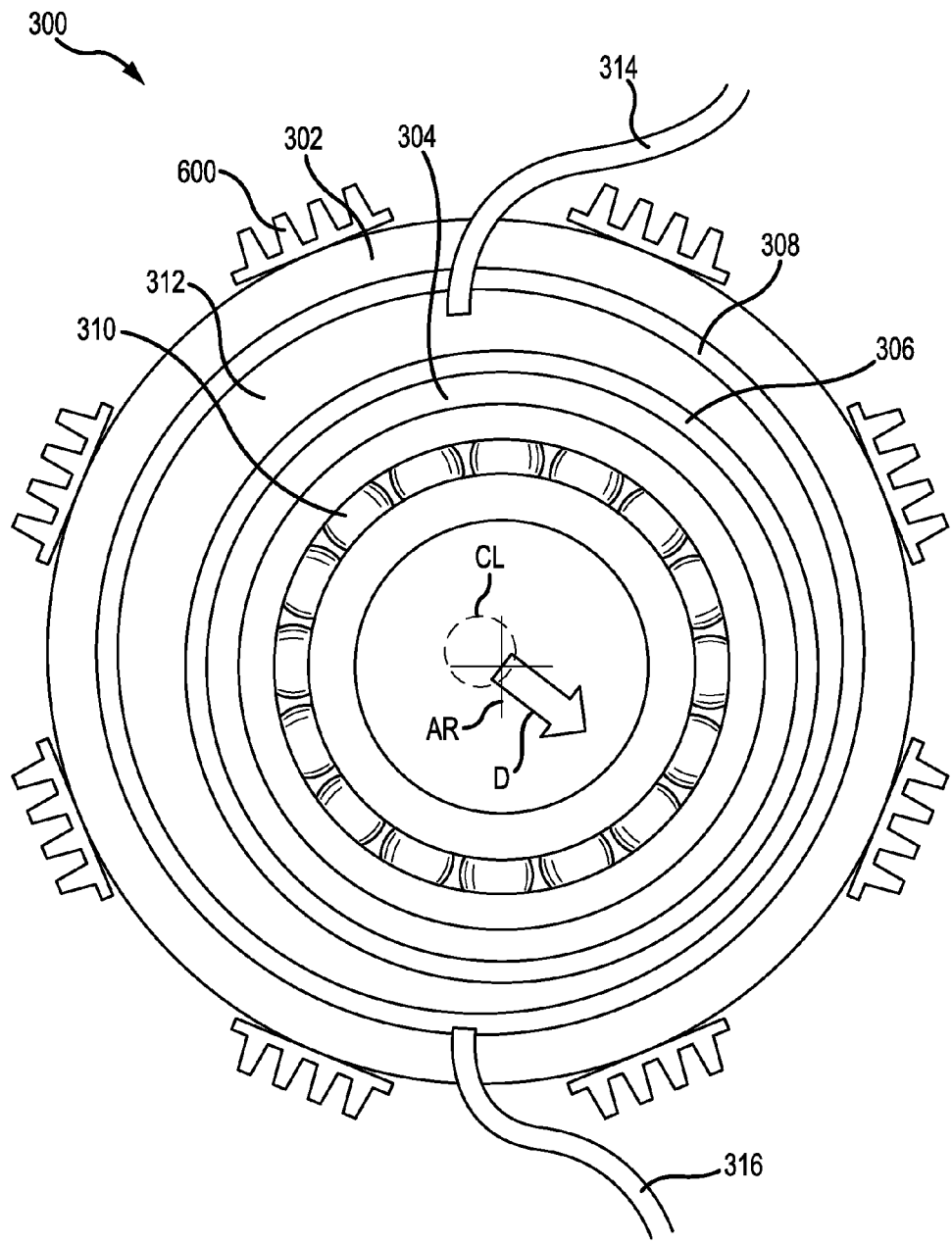
FIG. 6A illustrates a cross sectional view of a bearing housing looking forward to aft with the bearing housing having an inner damper, an outer damper, and cooling fins, in accordance with various embodiments.
Figure 6B:
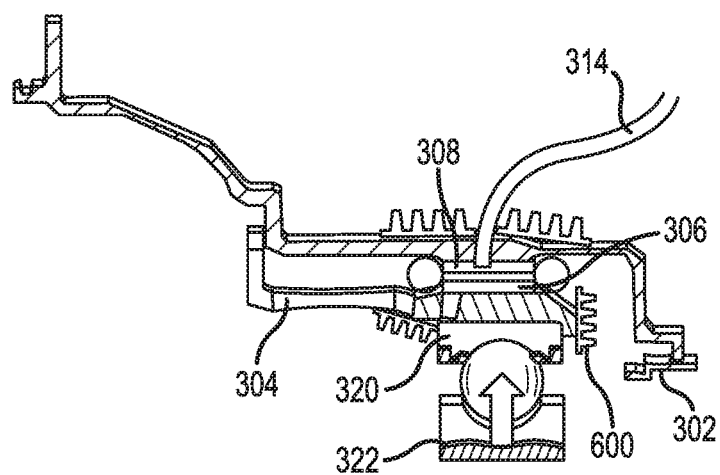
FIG. 6B illustrates a radial cross sectional view of a bearing housing having an inner damper, an outer damper, and cooling fins, in accordance with various embodiments.

With reference to FIGS. 6A to 6B, a bearing assembly 300 having cooling fins 600 is shown, in accordance with various embodiments. Cooling fins 600 may be coupled to hearing assembly 300 to provide conductive and convective cooling to cavity 312. Cooling fins may be coupled to housing 302, squirrel cage 304, or other suitable components in bearing assembly 300. The cooling fins may cool viscous fluid retained in cavity 312 by dissipating heat conducted from the viscous fluid, through components of the bearing assembly such as inner damper 306, outer damper 308, or squirrel cage 304. By reducing the heat of the viscous fluid, the viscosity of the viscous fluid may tend to increase and thereby improve damping characteristics of the damper system. The cooling fins may be made using additive manufacturing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A damper system, comprising:
    an inner damper having a first annular geometry and a first textured surface;

an outer damper comprising a second annular geometry disposed about the inner damper, the outer damper having a second textured surface;

a cavity at least partially defined by the first textured surface and the second textured surface, wherein the cavity is configured to contain a viscous fluid; and an intermediate damper comprising a third annular geometry disposed within the cavity between the inner damper and the outer damper.

2. The damper system of claim 1, wherein at least one of the inner damper or the outer damper comprises steel.

3. The damper system of claim 1, further comprising a cooling fin configured to cool the viscous fluid.

4. The damper system of claim 3, wherein the cooling fin is coupled to the housing.

5. The damper system of claim 1, wherein the inner damper is coupled to a bearing.

6. The damper system of claim 5, wherein the outer damper is coupled to a housing.

7. The damper system of claim 1, wherein at least one of the inner damper or the outer damper comprise a plurality of oil passages.

8. The damper system of claim 1, wherein at least one of the inner damper or the outer damper define a plurality of dimples.

9. The damper system of claim 1, wherein the intermediate damper comprises an inner surface facing the inner damper and an outer surface facing the outer damper, one of the inner surface or outer surface comprising a textured surface.

10. A bearing assembly, comprising:
a bearing having an annular geometry and configured to rotate about an axis;
a first damper disposed about the bearing with the first damper comprising a textured surface configured to contact a viscous fluid;
a housing disposed about the first damper, wherein the first damper is configured to dampen a deflection; and
a cooling fin coupled to the housing opposite the first damper, wherein the cooling fin is configure to cool the viscous fluid.

11. The bearing assembly of claim 10, further comprising a second damper disposed about the first damper, wherein the first damper and the second damper at least partially define a cavity configured to contain the viscous fluid.

12. The bearing assembly of claim 11, wherein the second damper comprises a second textured surface.

13. The bearing assembly of claim 11, further comprising a third damper disposed between the first damper and the second damper.

14. The damper system of claim 13, wherein the intermediate damper comprises an inner surface facing the inner damper and an outer surface facing the outer damper, one of the inner surface or outer surface comprising a textured surface.

15. The bearing assembly of claim 10, wherein the textured surface of the first damper comprises a plurality of oil passages.

16. The bearing assembly of claim 10, wherein the textured surface of the first damper defines a plurality of dimples.

17. A gas turbine engine, comprising:
a bearing having an axis of rotation, wherein the axis of rotation of the bearing is configured to deflect in response to a rotation of the bearing;
a housing disposed about the bearing;
an inner damper disposed about the bearing;
an outer damper disposed about the inner damper, wherein the inner damper and the outer damper define a cavity; and
an intermediate damper disposed within the cavity.

18. The gas turbine engine of claim 17, wherein the inner damper comprises a first textured surface configured to dampen deflection, wherein the first textured surface is made using additive manufacturing.

19. The gas turbine engine of claim 17, wherein the outer damper comprises a second textured surface configured to dampen deflection, wherein the second textured surface is made using additive manufacturing.

20. The gas turbine engine of claim 17, wherein the intermediate damper comprises an inner surface facing the inner damper and an outer surface facing the outer damper, the inner surface comprises a third texture surface, and the outer surface comprises a fourth texture surface, wherein the third textured surface and the fourth textured surface are configured to dampen deflection, and wherein the third textured surface and the fourth textured surface are made using additive manufacturing.

* * * * *